(12) United States Patent
Ingalls

(10) Patent No.: US 9,021,664 B2
(45) Date of Patent: May 5, 2015

(54) METHOD AND DEVICE FOR STORING AND CARRYING A PORTION OF ROPE

(71) Applicant: Doug Ingalls, Brewerton, NY (US)

(72) Inventor: Doug Ingalls, Brewerton, NY (US)

(73) Assignee: 2 Monkey Trading, LLC, Orlando, FL (US)

( * ) Notice: Subject to any disclaimer, the term of this patent is extended or adjusted under 35 U.S.C. 154(b) by 235 days.

(21) Appl. No.: 13/743,579

(22) Filed: Jan. 17, 2013

(65) Prior Publication Data

US 2014/0026371 A1    Jan. 30, 2014

Related U.S. Application Data

(60) Provisional application No. 61/587,473, filed on Jan. 17, 2012.

(51) Int. Cl.
*A44C 5/00*  (2006.01)
*F16G 11/00* (2006.01)

(52) U.S. Cl.
CPC ........... *F16G 11/00* (2013.01); *Y10T 29/49947* (2015.01); *Y10T 24/39* (2015.01); *Y10T 24/1397* (2015.01); *A44C 5/0007* (2013.01); *A44D 2205/00* (2013.01)

(58) Field of Classification Search
CPC .. F16G 11/00; A44C 5/0007; A44D 2205/00; Y10T 24/39; Y10T 24/1397
USPC ............................... 24/3.13, 302, 306, 115 K
IPC ......................................... Y10T 24/39, 24/1397
See application file for complete search history.

(56) References Cited

U.S. PATENT DOCUMENTS

| 4,691,852 | A | * | 9/1987 | Phelps | 224/150 |
| 4,911,347 | A | * | 3/1990 | Wilhite | 224/257 |
| 5,511,293 | A | * | 4/1996 | Hubbard et al. | 24/306 |
| 6,129,638 | A | * | 10/2000 | Davis | 473/215 |
| 8,863,362 | B2 | * | 10/2014 | Kelleghan | 24/615 |
| 2012/0159987 | A1 | * | 6/2012 | Walchle et al. | 63/3.2 |
| 2013/0031935 | A1 | * | 2/2013 | Kelleghan | 63/1.12 |
| 2014/0237780 | A1 | * | 8/2014 | Walchle et al. | 24/583.1 |

* cited by examiner

*Primary Examiner* — Robert J Sandy
(74) *Attorney, Agent, or Firm* — Kevin Keener; Keener and Associates P.C.

(57) ABSTRACT

An apparatus and method for carrying and storing a portion of rope is claimed. A portion of rope is braided and wound about two complementary loops. Attached to one complementary loop is a flexible fastener. The flexible fastener can be passed through the second complementary loop and attached to itself. The apparatus can then be worn as a bracelet. When the rope is needed, the person can unwind the rope. After using the rope, the rope can be rewound and then bound with the flexible fastener.

5 Claims, 4 Drawing Sheets

METHOD AND DEVICE FOR STORING AND CARRYING A PORTION OF ROPE

PRIORITY OF INVENTION

This non-provisional application claims the benefit of priority under 35 U.S.C. §119(e) to U.S. Provisional Patent Application Ser. No. 61/587,473 entitled, "Method and Device for Storing and Carrying a Portion of Rope", filed on Jan. 17, 2012, which is hereby incorporated by reference.

TECHNICAL FIELD

This application relates generally to storage and carrying devices and, more particularly, to storage and carrying devices and methods for carrying a portion of rope, unraveling and using said rope, and securing said rope with the same carrying device.

BACKGROUND

Survivalists often store portions of rope and particularly parachute cord (paracord) about their wrists in the form of woven bracelets for later use. In such a form, the portion of paracord is knotted or woven about itself so that it occupies a small volume that may be unfurled for use by a wearer. In such form, the opposing ends of these woven bracelets are often joined using either knots or plastic slide buckles. Such methods are both unreliable in their locking and uncomfortable during extended wear. Such a method of carrying a rope is also limited in that once the rope is unwound from the buckles there is no further use for the buckles. Also, once unwound, there is no means to re-secure the rope in a manner so that the rope again occupies a small volume.

What is needed is a means for carrying a rope in the form of a bracelet which can then be reused to store the rope once the rope is unwound.

DETAILED DESCRIPTION

Figure 1:
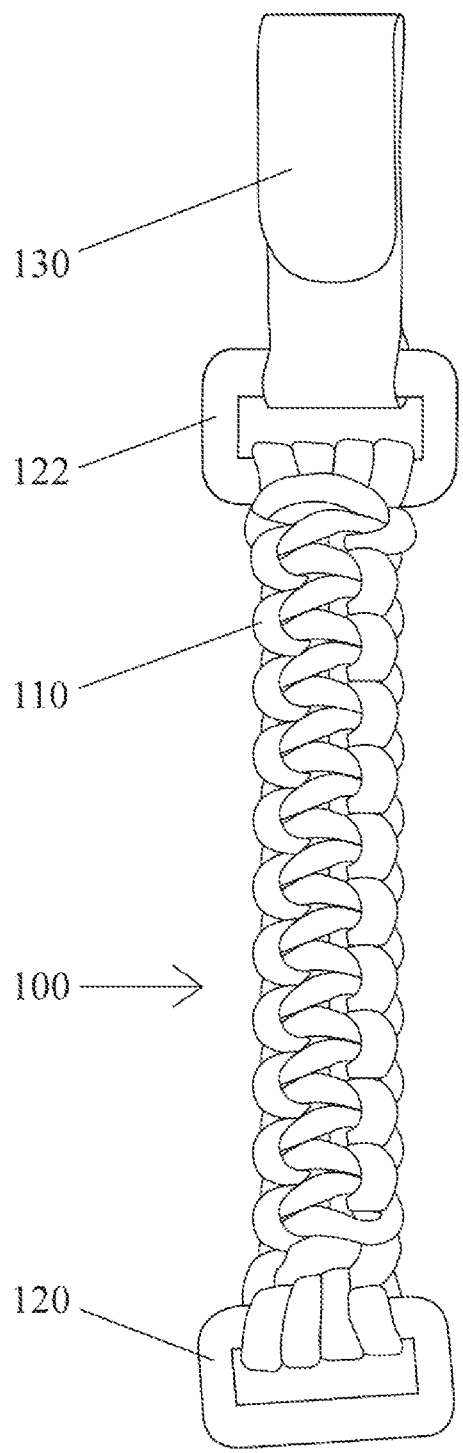
FIG. 1 shows a view of the braided rope with strap connector
Figure 2:
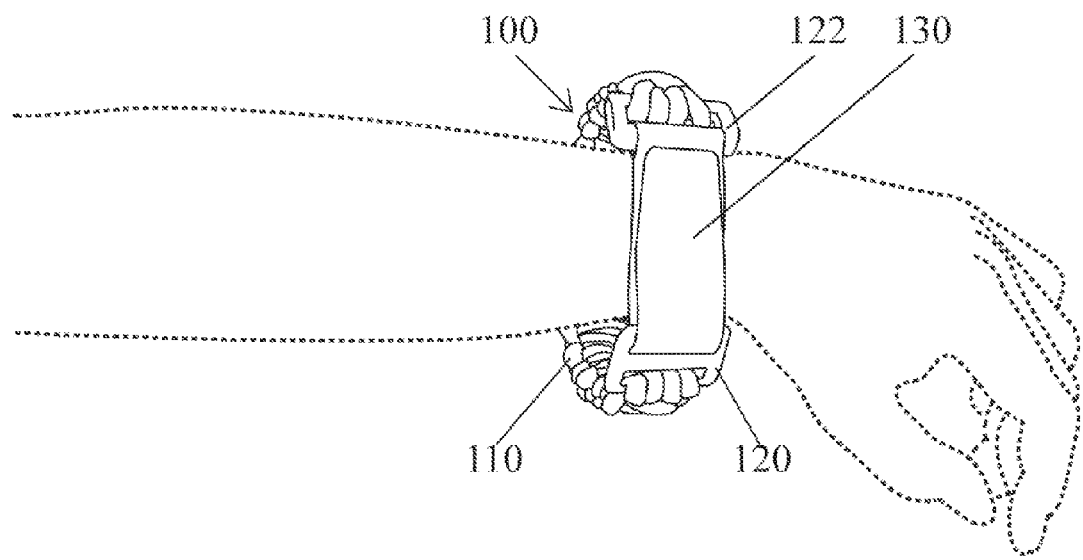
FIG. 2 shows a view of the braided rope with strap connector being worn as a bracelet

FIG. 1 shows a device and method for carrying and storing a portion of rope 100 according to an embodiment of the invention. A portion of rope 110 is braided and wound about two complementary loops 120. The exterior side of one of the complementary loops is coupled to a flexible fastener 130. The flexible fastener may be passed through the other complementary loop and fastened to itself, thus allowing the user to wear the item as a bracelet, as is shown in FIG. 2.

Figure 3:
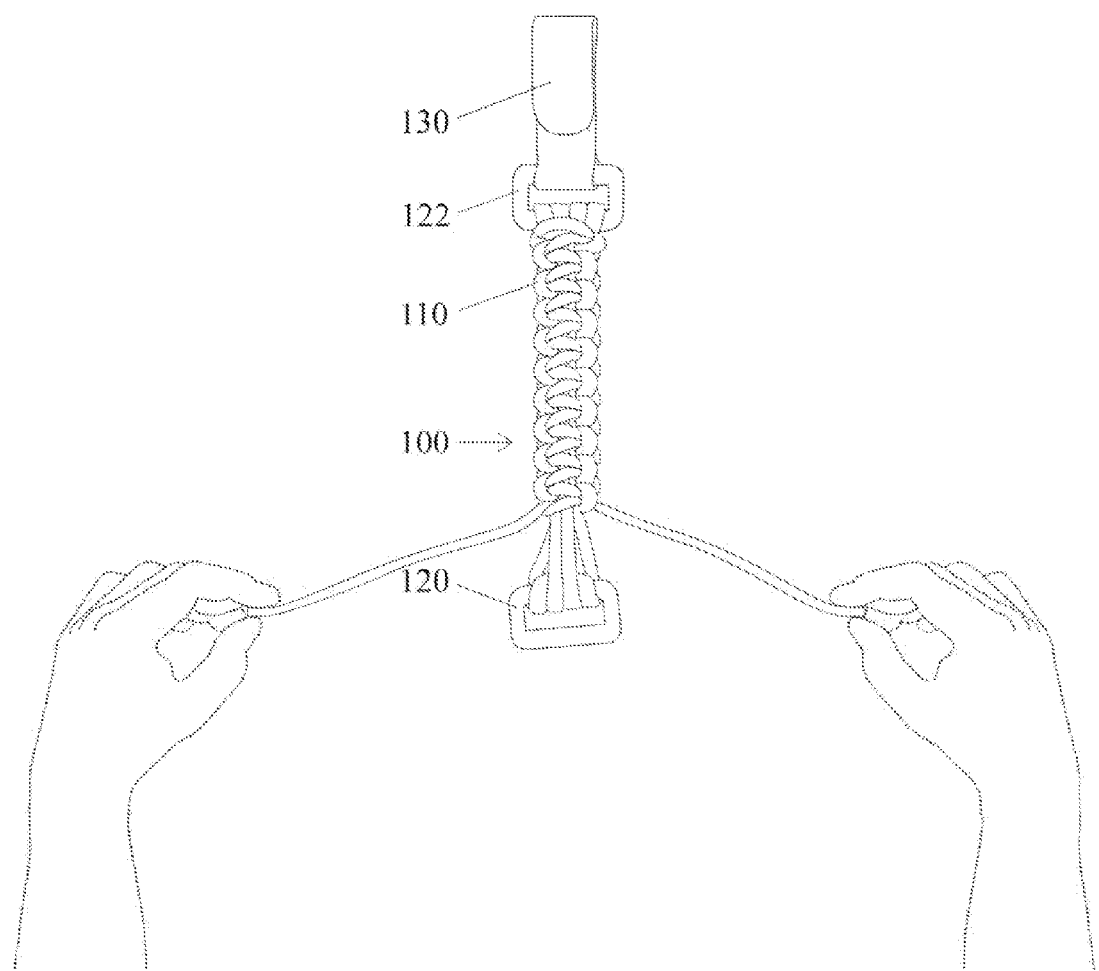
FIG. 3 shows a view of the rope being unbraided and unwound from the strap connector

FIG. 3 shows that the rope 110 may be unwound and unsecured from the complementary loops 120 so that the wearer may use the rope for a multitude of purposes.

Figure 4:
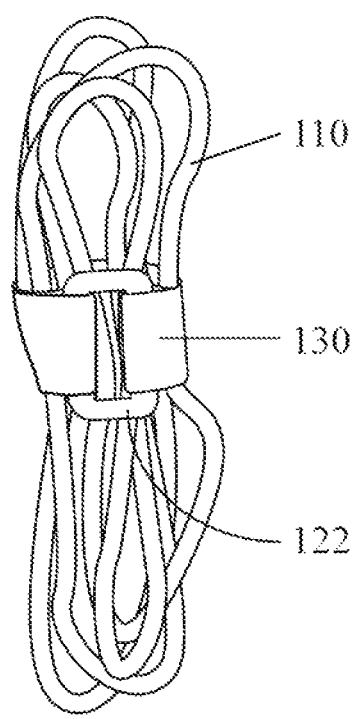
FIG. 4 shows the disconnected rope being looped and rebound by the strap connector

FIG. 4 shows that when the wearer no longer has need of the rope, the wearer may loop the rope 110 and use the flexible fastener 130 to once again secure the rope.

The utilization of the invention allows a user to carry a portion of rope 110 in a compact and efficient manner by wearing the portion of rope as a bracelet. FIG. 2. The rope 110 is braided. One end of the braided rope 110 is wound about a complementary loop with a free end 120. The other end of the braided tope and wound about another complementary loop 122 to which is attached a flexible fastener 130. The flexible fastener 130 has the means of attaching and securing to itself. This attaching and securing can be accomplished through the use of a snap or hook and loop tape. The flexible fastener 130 can be wound through the free end of the first complementary loop 120 and attached to itself to make a bracelet 100 that can be worn around the wrist FIG. 2. This is beneficial for survivalists and hikers. They may carry a rope for use in emergency situations. Carrying a rope in a backpack is not always efficient because backpacks can be cumbersome to wear and may not be practical in all situations. When a hiker or survivalist finds a need for a portion of rope 110, the hiker can unbraid the rope 110 from the complementary loops FIG. 3. Then the rope 110 can be used for a multitude of purposes, such as securing a tent or tying a safety line. Once the rope 110 has been used, it can then be stored for later by looping the rope 110 and securing it with the flexible fastener FIG. 4. This is an improvement over the prior art. Other portions of rope braided and worn as bracelets are secured by other means such as buckles that are nonflexible. These other means for securing the bracelets do not have the capability of resecuring or rebinding the rope 110 after it has been used.

The rope that is carried can be made from a variety of materials, such as twine, or 550 paracord. The complementary loops can be made from a flexible material or from a rigid, hard, non-flexible plastic.

The flexible fastener can be made from a variety of materials, such as nylon or polyester, or leather, or cloth. The flexible fastener has a means for attaching to itself, such as a hook and loop, a button, or clasp.

The apparatus, when the portion of rope is wound and braided, can range in length between 7.5" and 8.5".

The invention claimed is:

1. An apparatus for carrying and storing rope, comprising:
    a pair of complementary loops with each loop having a first end and a second end;
    a rope wound around the first end of each said loop;
    a flexible fastener securely attached to the second end of one of the complimentary loops, said flexible fastener able to be wrapped through the second end of the second complementary loop;
    and means for attaching said flexible fastener to itself;
    wherein the complementary loops are comprised of a hard, non-flexible plastic;
    wherein the rope is comprised of 550 paracord.

2. An apparatus as in claim 1 wherein the flexible fastener attaches to itself by means of hook and loop tape.

3. An apparatus as in claim 2 wherein said apparatus measures between 7.5" and 8.5" in length.

4. A method for carrying and storing rope, comprising the steps of:
    winding a rope through the first ends of a pair of complementary loops;
    securely attaching a flexible fastener to the second end of one complementary loop;
    wrapping said flexible fastener through the second end of the second complementary loop;
    and attaching said flexible fastener to itself.

5. The method as in claim 4 further comprising the steps of:
    unwinding and using said rope;
    rewinding said rope after such usage;
    binding said rope with said flexible fastener;

and attaching and securing said flexible fastener to itself.

\* \* \* \* \*